United States Patent [19]

Brown et al.

[11] Patent Number: 5,075,792
[45] Date of Patent: Dec. 24, 1991

[54] LOW POWER OPTICAL TRANSCEIVER FOR PORTABLE COMPUTING DEVICES

[75] Inventors: Preston D. Brown, Eugene; Lester S. Moore; Dennis C. York, both of Corvallis, all of Oreg.

[73] Assignee: Hewlett-Packard Company, Palo Alto, Calif.

[21] Appl. No.: 326,140

[22] Filed: Mar. 20, 1989

[51] Int. Cl.$^5$ .................................................. H04B 10/00
[52] U.S. Cl. .................................. 359/152; 359/154; 341/69
[58] Field of Search ............... 455/606, 603, 607, 608, 455/619, 617; 341/69

[56] References Cited

U.S. PATENT DOCUMENTS

| | | | |
|---|---|---|---|
| 3,867,628 | 2/1975 | Brown | 250/214 B |
| 3,902,060 | 8/1975 | Neuner | 455/608 |
| 3,968,361 | 7/1976 | Bumgardner | 455/619 |
| 4,213,119 | 7/1980 | Ward et al. | 455/608 |
| 4,449,206 | 5/1984 | Tokitsu et al. | 455/606 |
| 4,628,541 | 12/1986 | Beavers | 455/608 |
| 4,654,892 | 3/1987 | Ely | 455/619 |
| 4,783,137 | 11/1988 | Kosman et al. | 455/606 |
| 4,837,556 | 6/1989 | Matsushita et al. | 455/606 |
| 4,856,090 | 8/1989 | Kitani et al. | 455/607 |
| 4,885,804 | 12/1989 | Mayle | 455/606 |

FOREIGN PATENT DOCUMENTS 0313383  4/1989  Japan .................................. 455/608

*Primary Examiner*—Reinhard J. Eisenzopf
*Assistant Examiner*—Kinfe-Michael Negash

[57] ABSTRACT

Optical transceiver (22) for calculator-to-calculator or calculator-to-module communication. The transceiver (22) includes an IR transmitter (24) and IR receiver (26) designed for use in the low power, low cost environment of calculators and portable computing devices. The transceiver may be adapted to communicate with the CPU (central processing unit (14) of a calculator (90) directly or with that of a portable computing device via its serial port (43). Devices in which the optical transceiver may be incorporated include calculators, plugless modules, and books containing plugless modules. Data such as mathematical formulas within the book may be stored in the associated module and transferred instantaneously and accurately to an adjacent calculator upon request by the calculator.

6 Claims, 4 Drawing Sheets

LOW POWER OPTICAL TRANSCEIVER FOR PORTABLE COMPUTING DEVICES

BACKGROUND OF THE INVENTION

This invention relates to I/O apparatus for computing devices and, more particularly, to a low power optical transceiver that can be simply and inexpensively incorporated into a portable computing device such as a solar or battery-powered calculator or be coupled to a computer.

Computing devices such as calculators and computers conventionally communicate with other devices through a cable that physically connects to an I/0 port on each device. The integrity of the communication may be degraded, however, by physical wires within the cable. The wires produce electromagnetic radiated noise and provide a path for destructive ESD (electrostatic discharge).

Communicating information optically avoids the drawbacks associated with wire connections. IR (infrared) transmitters are currently employed in the portable computing environment such as in the battery-powered Hewlett-Packard 28S calculator. The IR transmitter within that calculator draws so little power that the calculator, with only battery power, can transmit information such as data and instructions to a printer equipped with an IR receiver.

To date, however, it has been impractical to include a corresponding IR receiver within the portable computing device for receiving data. Prior IR receivers are too large, costly, and power hungry to be adapted for use in a portable computing device. Adding an IR receiver would enable the portable device to receive information more accurately and quickly than is possible through plug-in modules, cards or by manual entry.

SUMMARY OF THE INVENTION

An object of the invention, therefore, is to provide an improved I/O apparatus for communicating information optically between portable computing devices.

Another object of the invention is to provide such an I/O apparatus that is inexpensive, reliable, draws little power, and can be readily incorporated into an existing portable computing device such as a solar or battery-powered calculator with only minor adaptation of the device.

Yet another object of the invention is to provide such an I/O apparatus suitable for use in other devices that may communicate with a portable computing device, such as programmable modules and personal computers.

In accordance with these objects, such apparatus comprises an optical transceiver coupled to a processing means. In one embodiment of the apparatus, the transceiver is designed to communicate directly with the microprocessor within a calculator. In a second embodiment, such apparatus is designed to enable the transceiver to communicate with a personal computer through its serial port using the RS232 standard.

To conserve power, means are provided within the apparatus to format the information to be communicated so that each bit is represented either as a brief pulse or no pulse, depending on the logic state. The bit pulse occupies a fraction of the bit time corresponding to the bit rate.

Devices in which the optical transceiver may be incorporated include computers, calculators, modules, and books containing the modules. Data such as mathematical formulas within the book may be stored in the associated module and transferred instantaneously and accurately to an adjacent calculator upon command.

The foregoing and other objects, features, and advantages of the invention will become more apparent from the following detailed description of a preferred embodiment which proceeds with reference to the accompanying drawings.

DETAILED DESCRIPTION

Figure 1:
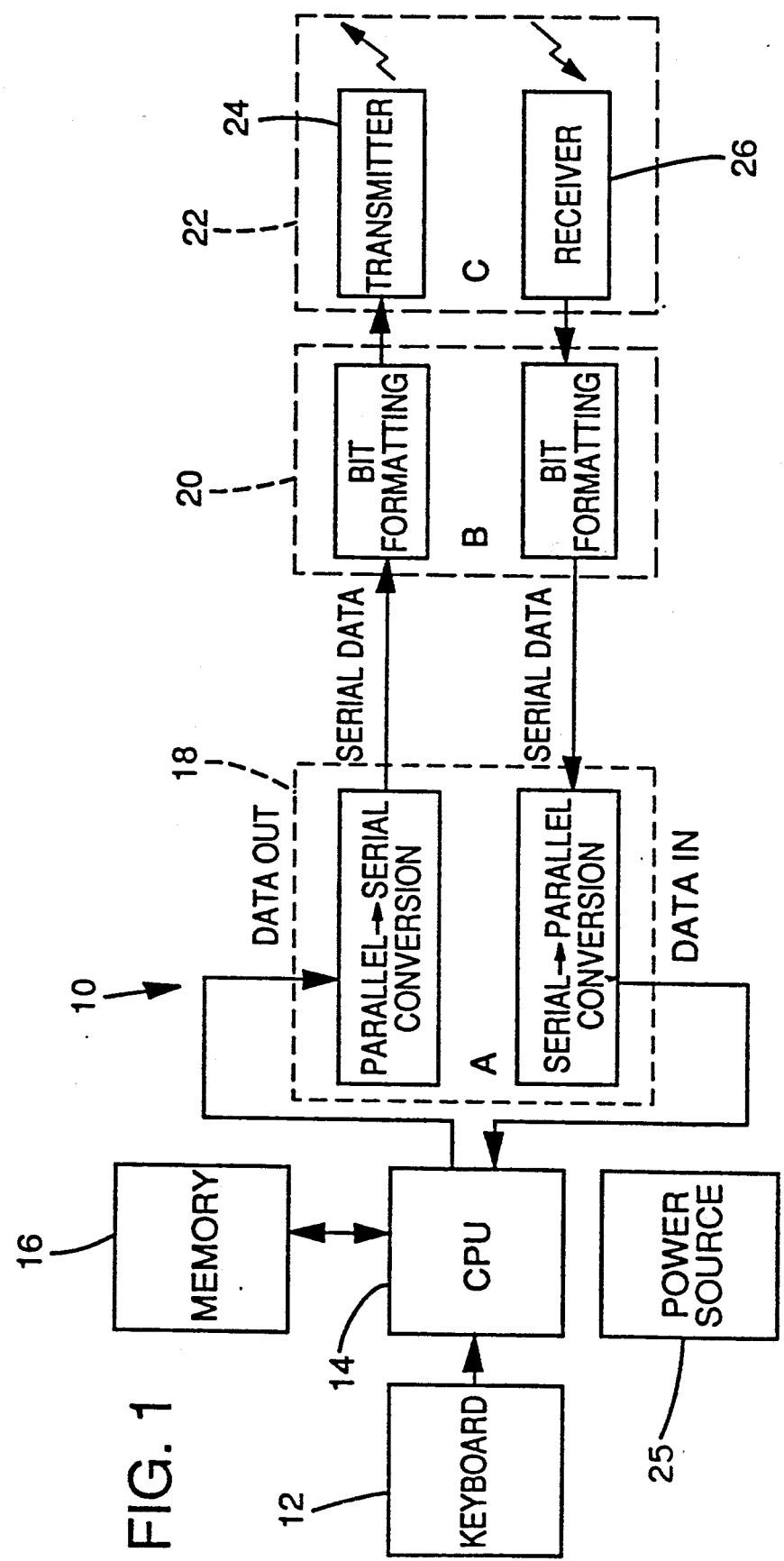
FIG. 1 is a functional block diagram of an apparatus according to the invention.

Referring now to FIG. 1 of the drawings, there is shown a functional block diagram of an apparatus 10 constructed according to the invention within the context of a computer system. The apparatus may be found in a hand-held calculator or other portable computing device. The computer includes an electronic keyboard 12 having a plurality of keys. By pressing a key, one can send information such as data and instructions to processing means such as a central processing unit (CPU) 14. The CPU 14 also communicates with a memory 16 that may store data as well as operating system and application programs. For optical communication, the CPU 14 is coupled to parallel-to-serial data conversion means (represented by block 18), bit formatting means (represented by block 20) and a transceiver 22. The transceiver in turn comprises an IR transmitter 24 and IR receiver 26 for transmitting and receiving IR signals. Power for the computer system including apparatus 10 is provided by a self-contained power source 25 such as a battery or solar cell. As will become evident from the following description, the novel features of the present invention include the design of transceiver 22 and the formatting of the information for communication. With these features, the invention is readily incorporated into a low power, portable computing environment such as a hand-held calculator or information module. As will also become evident to those skilled in the art from the following description, the functions identified in the blocks above can be carried out by many types of functionally equivalent structure.

Figure 7:
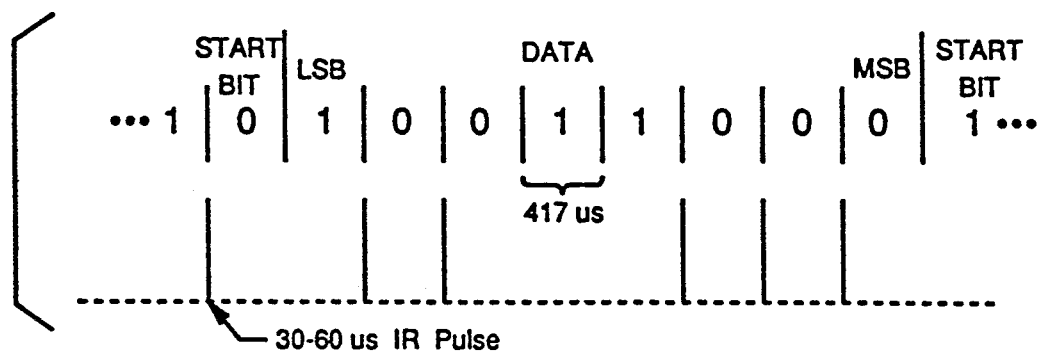
FIG. 7 illustrates the power-saving format employed for communicating bits to and from a transceiver.

Data to be transmitted may initially be entered into memory 16 by way of keyboard 12 and CPU 14. Upon pressing a programmed key (not shown) on keyboard 12, the CPU 14 reads the data from memory 16 for transmission via a conventional protocol. A data protocol suitable for this environment is the Kermit protocol, which is amply described in *Kermit, A File Transfer Protocol* (1987) and is incorporated herein by reference. Before transmitting the data optically, however, it is first converted by the parallel-to-serial conversion means 18 and then bit formatted at 20 to convert the "nonreturn to zero" bit format of the RS232 standard to a "return to zero" bit format. As shown in FIG. 7, means such as this bit formatting converts the normal RS232 serial output of −5V and +5V to short pulse signals, a positive pulse for logic 0 and no pulse for logic 1. The positive pulse occupies only a fraction of the bit time corresponding to the bit rate, time during which a bit signal is normally present. For example, in FIG. 7, each bit time at the given bits per second rate is 417 microseconds. The nonpulse, of course, occupies no bit time and takes no power.

This formatting is done to save power and to simplify the receiver design. With the improved formatting, the LED within transmitter 24 is thus on for only a brief time rather than a full bit time to indicate a logic 0 bit and is off completely to indicate a logic 1 bit. In the present embodiment, the improved format consumes on the average less than 7% of the power previously required for full bit times. The short pulses, which the LED converts to IR, can also be more easily detected in receiver 26, as will be explained. Detection of IR pulses that last the entire bit length would require a much more complicated circuit in receiver 26. The newly formatted bits are then routed from 20 to the transmitter 24 for IR transmission.

To receive data, similar steps are followed in reverse. The receiver 26 receives IR pulses; bit formatting means 20 converts the bits from the format in FIG. 4 to the "nonreturn to zero" format; parallel-to-serial conversion means 18 converts the serial data to parallel data; and CPU 14 decodes the data according to the protocol.

Figure 2:
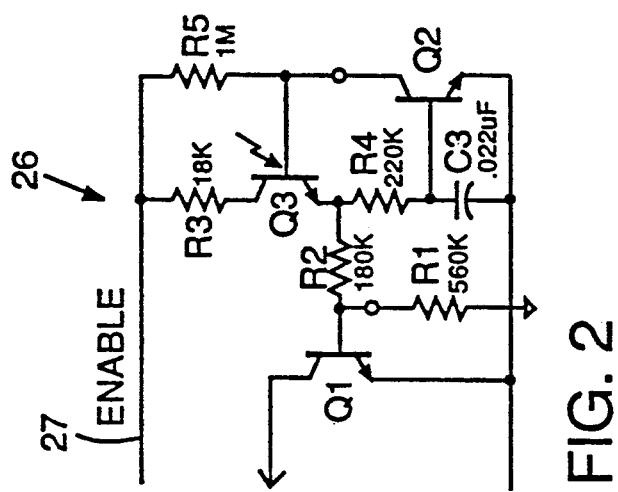
FIG. 2 is a schematic diagram of an IR receiver within the apparatus of FIG. 1.

Referring now to FIG. 2, there is shown a schematic diagram of the IR receiver 26. Enable line 27 from a source to be described supplies a signal to the transistors of the receiver 26 when it is desirable to activate the receiver circuit. The receiver 26 includes a phototransistor Q3 adapted to respond to light. To compensate for ambient light effects on the conductive threshold of phototransistor Q3, a transistor Q2 is coupled in feedback to the emitter and base of the phototransistor. As ambient light fluctuates in intensity, the bias current through resistor R5 into the base of phototransistor Q3 may increase, rendering the phototransistor momentarily conductive. When conducting, the phototransistor Q3 produces an emitter current that drives transistor Q2. When so driven, transistor Q2 draws sufficient bias current from the base of phototransistor Q3 to render it again nonconductive. Thus, the receiver 26 is designed not to respond to the normal, gradual fluctuations in ambient light.

To detect the IR pulses carrying information, means such as a capacitor C3 are provided for filtering the IR pulses from ambient light. Capacitor C3 is coupled between the base of transistor Q2 and ground. The IR pulses, because of their high frequency nature, are diverted to ground rather than routed to transistor Q2. As a result, the transistor Q2 does not conduct in response to an IR pulse and phototransistor Q3 remains conductive when the IR pulse is received.

When IR pulses are present, emitter current produced by the phototransistor Q3 is directed to ground and to the base of transistor Q1 through biasing resistors R1 and R2. Transistor Q1 is a buffer means for converting the received IR pulse to a corresponding digital input signal.

Figure 3:
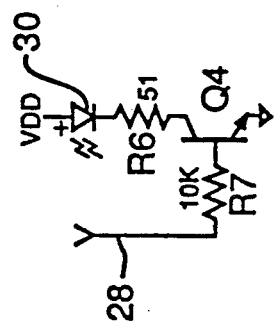
FIG. 3 is a schematic diagram of an IR transmitter within the apparatus of FIG. 1.

The circuit for IR transmitter 24 is shown in FIG. 3. Line 28 carries the information to be transmitted. When active, the line 28 carries voltage pulses that are applied to a current-limiting resistor R6 coupled to the base of a transistor Q4. The current renders transistor Q4 conductive. The collector of transistor Q4 in turn is coupled through a resistor R7 to an LED 30 that is connected to a voltage supply VDD. The LED 30 transmits IR pulses when conducting current. To activate the LED, voltage pulses on line 28 thus cause transistor Q4 to conduct current through its collector. This completes a circuit for LED 30 and causes the LED to transmit IR pulses.

Figure 4:
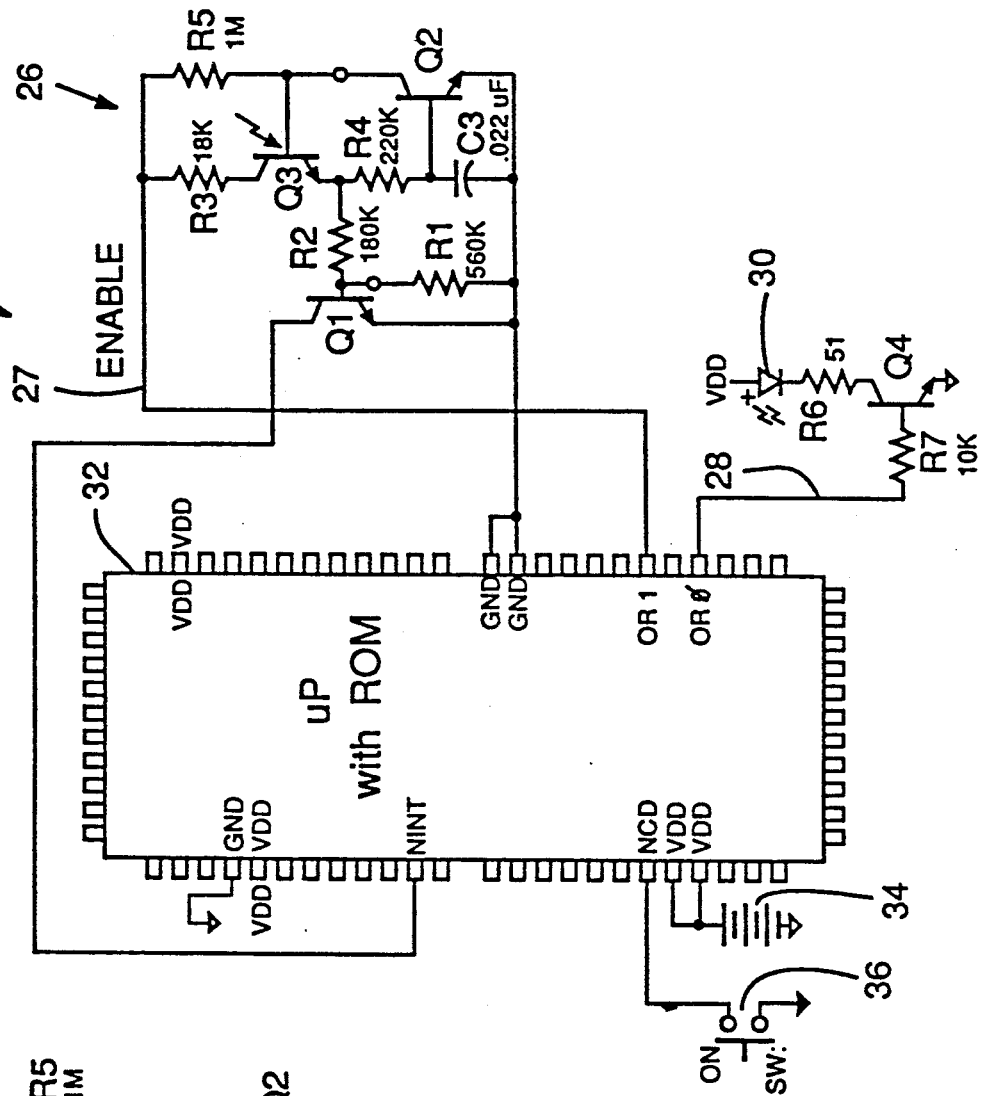
FIG. 4 is a schematic diagram of a first embodiment of the apparatus.

FIG. 4 shows one embodiment of the apparatus 10 of FIG. 1 in which the CPU 14 comprises a conventional microprocessor 32. The parallel-to-serial data conversion and bit formatting are performed by software routines stored within associated ROM (read only memory). Battery 34 provides power to the microprocessor 32. This embodiment may be used for "plugless" modules that contain data, instruction, or other information such as mathematical formulas in ROM. The information therein is transmitted to a calculator or other portable computing device which is of similar design. As shown in the figure, enable line 27 of circuit 26 is connected to an output pin OR1 of microprocessor 32. This line is enabled by actuating switch 36. The switch 36 pulls an active low wake-up input signal to the microprocessor 32. The low input signal causes the microprocessor 32 to leave its very low power state and enable the IR receiver 26. If no IR signal requesting data is received by receiver 26 after the predetermined time, the microprocessor reenters its very low power state. If an IR signal is received, the digital input signal produced by transistor Q1 is interpretable by microprocessor 32. The collector of transistor Q1, from which the input signal emanates, is coupled to an interrupt pin of the microprocessor. Thus, a change in the collector voltage on transistor Q1 alerts the microprocessor 32 whenever an IR signal containing information is received. In this embodiment with only ROM employed, microprocessor 32 normally receives only a transmit instruction through receiver circuit 26 and responds by transmitting the data in ROM to the requesting calculator or other device.

Transmitter 24 is coupled through line 28 to an output pin OR0 of microprocessor 32. In transmitting information, the microprocessor rapidly pulses the LED 30 as illustrated in FIG. 7. Logic 1 is no pulse of IR light for the bit and logic 0 is a short (30–60 microsecond) pulse of IR light at the beginning of the bit. In this embodiment, a frame consists of a start bit (logic 1), eight data bits (no parity) and at least two stop bits (logic 1). This encoding scheme may be translated to standard asynchronous serial data by lengthening the pulses to a full bit time which is 417 microseconds at 2400 baud, as will be described. The microprocessor is also programmed to receive data transmitted to it in the format illustrated in FIG. 7.

Within a calculator employing RAM, apparatus 10 is similar in design to what is shown in FIG. 4, except that it allows information to be received and stored as well. In a calculator, keyboard 12 and memory 16 communicate with the microprocessor 32 for inputting information to be transmitted and for storing information that is received.

To prevent receiver circuit 26 from receiving locally transmitted information, microprocessor 32 operates the transceiver in half-duplex mode, with only the transmitter 24 or receiver 26 activated at any given time.

Figure 5:
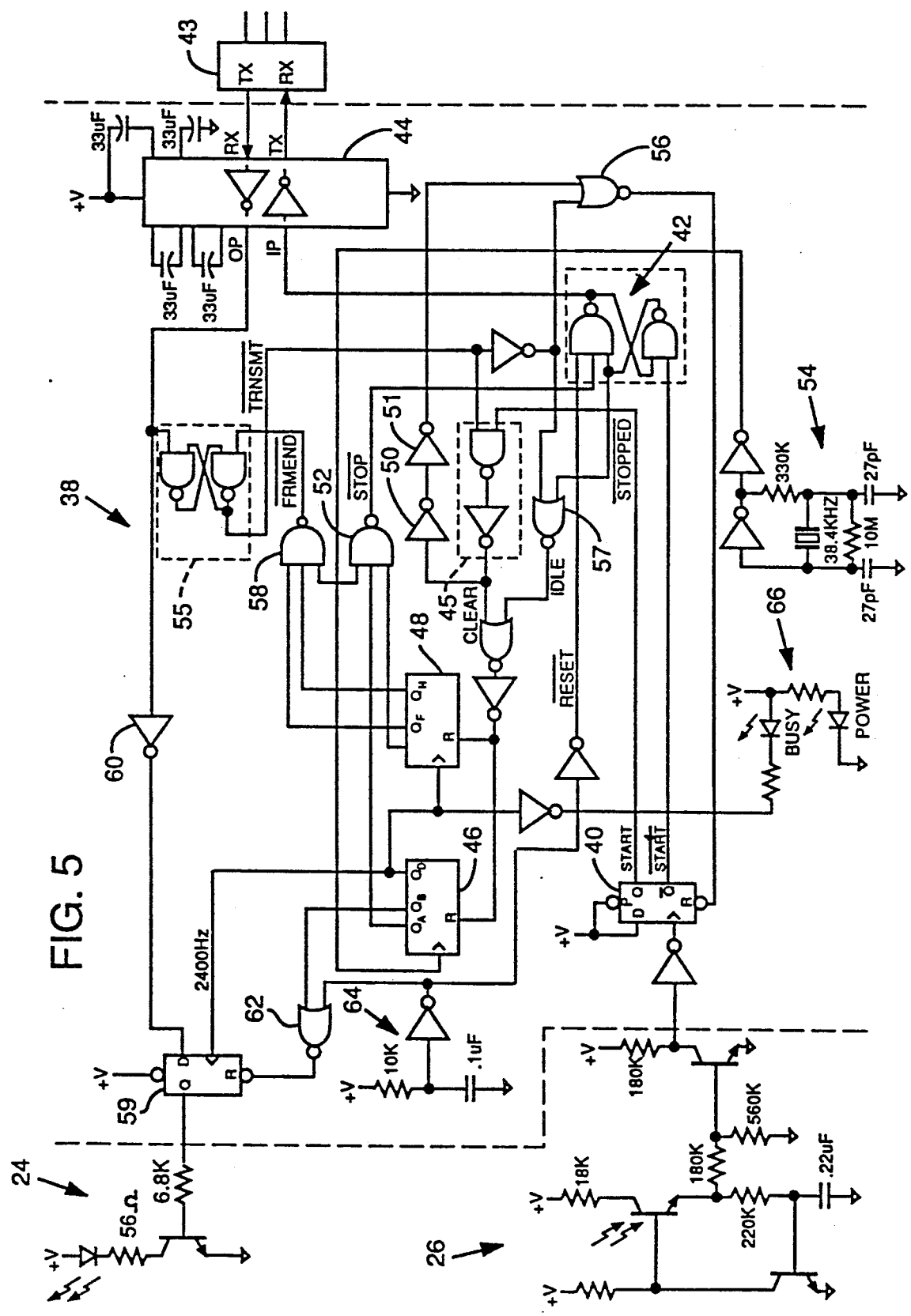
FIG. 5 is a schematic diagram of a second embodiment of the apparatus.

FIG. 5 shows a second embodiment of the apparatus 10 constructed for enabling a computer (not shown) to transmit and receive IR signals via the RS232 standard at the computer's serial port. At the lower left of the figure is the receiver circuit 26 and at the upper left of the figure is the transmitter circuit 24. In this embodiment a circuit 38 is shown between the dashed lines. Circuit 38 performs the bit formatting represented by block 20. CPU 14 of the computer and its associated peripheral circuitry performs the parallel-to-serial data conversion represented by block 18. On transmission from the computer, the bit formatting function converts the standard RS232 bits to the short pulses desirable for IR transmission. On reception, the short pulses are stretched out to the full bit time, resulting in a format compatible with the RS232 standard.

In operation of the receiver portion of circuit 38, bits received by the receiver 26 are applied as a clock signal to a D flip-flop 40 to generate START and $\overline{\text{START}}$ signals each time an IR pulse is received. Signals such as START are active high and signals such as $\overline{\text{START}}$ are active low. $\overline{\text{START}}$ activates SR flip-flop 42 whose output signal IP is amplified by buffer 44 to produce a logic 0 bit as a TX output of circuit 38. An RS232 cable connects the TX output of circuit 38 to the R input of the computer's serial port 43. The start signal, when active, also renders $\overline{\text{STOPPED}}$ inactive to allow counters 46 and 48 to count, as will be described. The START signal is applied to AND function 45 to generate a CLEAR signal which clears (resets) counters 46 and 48. After a short delay through gates 50 and 51 to ensure reset of the counters, CLEAR also clears (resets) flip-flop 40. This clearing of the flip-flop renders START and CLEAR inactive, and counters 46 and 48 then begin counting. With the counters counting, the output signal IP is stretched to the full RS232 bit time. The length of the IP signal is determined by the clock generation circuit 54 and the state of the counters as decoded by NAND gate 52. Once the counters have reached a predetermined time as decoded by the NAND gates, the gate generates a STOP signal to clear (reset) SR flip-flop 42. The flip-flop's output signal IP is thus cleared and the TX output of circuit 38 returns to the RS232 default logic one state. Additional IR pulses or lack thereof in the frame (illustrated in FIG. 7) are treated in like manner. When a frame is complete, the TX output of circuit 38 returns to the default logic one state.

In the transmitter portion of circuit 38, bits transmitted from the computer's serial port are routed through the ports' TX output to the RX input of circuit 38 as illustrated. There, each bit is buffered by output buffer 44. Recall that the first bit in the frame of FIG. 7 is a start bit. SR flip-flop 55 is activated by the start bit sent by the computer serial port 43 and generates $\overline{\text{TRNSMT}}$. The $\overline{\text{TRNSMT}}$ signal, when active, enables counters 46 and 48 to run by clearing the IDLE signal at the output of NOR gate 57. As mentioned, a cleared IDLE signal removes the reset signal to the counters and allows them to count. $\overline{\text{TRNSMT}}$ also prevents IR reflections from the transmitter 24 from being received by receiver 26. $\overline{\text{TRNSMT}}$ does this by holding D flip-flop 40 in reset via NOR gate 56. By locking out receiver 26, circuit 38 allows only half duplex communication.

While the counters 46 and 48 run, they generate a 2400 hertz signal that is applied as a clock input to D flip-flop 59. This 2400 hertz signal persists until the counters generate a $\overline{\text{FRMEND}}$ signal, a frame end signal at the end of each frame, through gate 58. The signal OP from the computer is sampled each time a 2400 hertz output of counter 46 goes high at D flip-flop 59. Because the counter output is delayed until output QD of counter 46, the flip-flop 59 is clocked in the middle of each bit of the OP signal for an accurate sample. The bit value of OP is inverted by gate 60. The QB output from counter 46 through NOR gate 62 sets the length of the LED pulse by controlling the reset of flip-flop 59. The time difference between generating QD and the following QB is about two clock cycles, or 30 to 60 microseconds.

Other portions of circuit 38 include a power-on reset circuit 64 and an indicator circuit 66. The circuit 64 resets the output of circuit 38 when power is applied. Circuit 66 includes two LEDs for indicating if the circuit 38 is active and for indicating if power is present.

Figure 6:
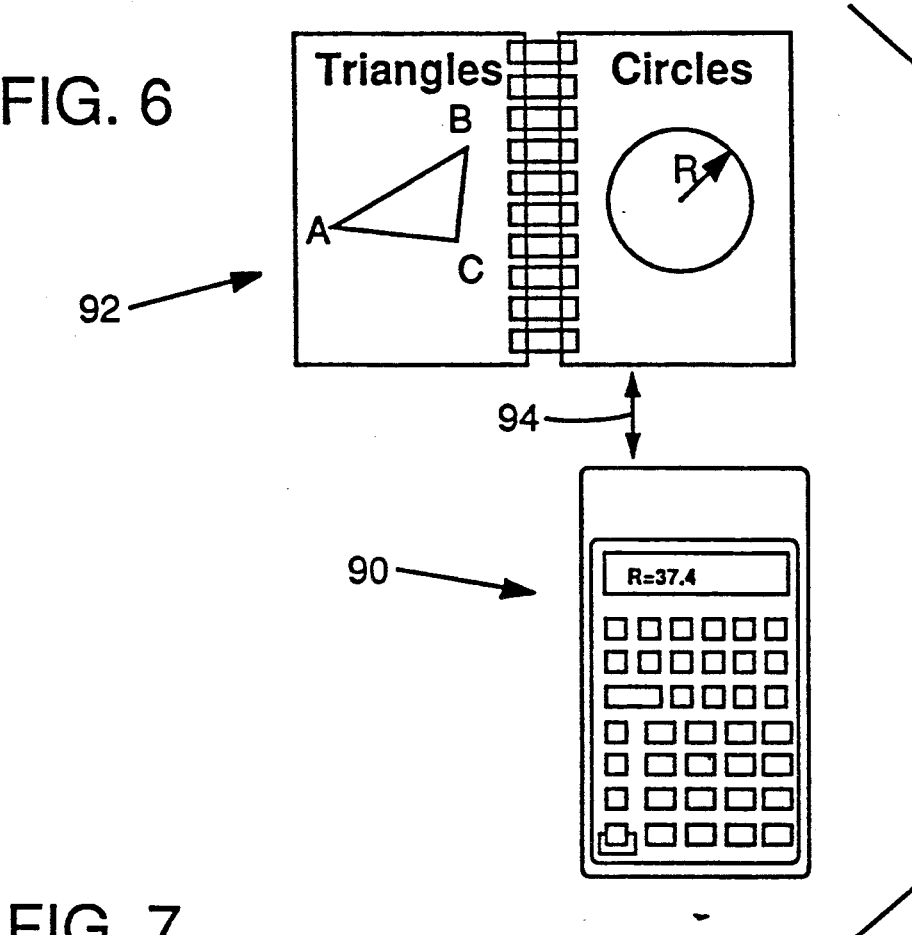
FIG. 6 is a pictorial view illustrating optical communication between a book and calculator that each includes an according to the invention.

FIG. 6 illustrates the incorporation of apparatus 10 into a calculator 90 and book 92 containing information such as mathematical formulas for calculation. The book is constructed for housing the power source 25, microprocessor 30, memory and the optical transceiver 22. Rather than having to read and then manually enter such formulas in the calculator, the apparatus 10 within book 92 enables a user to load the formulas instantaneously and accurately via IR signals into calculator 90 via its own apparatus 10. For this the apparatus 10 within book 92 stores at least some of the information written in the book. The microprocessor 32 within book 92 is programmed to transmit data to calculator 90 via transmitter 24 in response to an IR signal request from the calculator, as indicated by arrows 94.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. Apparatus for optical communication, comprising,
    a data processor for processing information as the information is transmitted or received at a given bits per second rate
    and for formatting the information for transmission from a nonreturn to zero bit format to a return to zero bit format and for reception from a return to zero bit format to a nonreturn to zero bit format; and
    an optical transceiver coupled to the data processor for transmitting and receiving the information so formatted, the optical transceiver comprising an IR transmitter and IR receiver, the IR receiver further comprising:
    a phototransistor for receiving an IR signal;
    a first transistor having its collector coupled to the base of phototransistor and its base coupled to the emitter of the phototransistor for compensating for the effects of ambient light on the conducting threshold of the phototransistor;
    a capacitor coupled between the base of the first transistor and ground for filtering the effects of the received IR signal from the effects of ambient light on the operation of the first transistor; and
    a second transistor having its base coupled to the emitter of the phototransistor and base of the first transistor for converting the received IR signal to a corresponding signal interpretable by the data processor.

2. The apparatus of claim 1 wherein the optical transceiver (22) comprises an IR transmitter (24) and IR receiver (26), the transceiver (22) operable by the data processor (14) in half duplex communication.

3. The apparatus of claim 1 including a hand-held portable computing device having a keyboard and display in which the data processor and optical transceiver are embedded, the computing device further including a pressable key for initiating the transmission or reception of data through the optical transceiver.

4. Apparatus for processing information and communicating such information optically, comprising:
   a portable electronic computing device including a data processor, data entry means and a display, the computing device capable of manipulating data and acting on instructions entered through the data entry means and for displaying data as it is entered and processed;
   a self-contained power source within the computing device for providing power to the device;
   an optical transceiver within the computing device including an IR transmitter and IR receiver constructed to operate on power provided by the self-contained power source, the transceiver for transmitting information including data and instructions processed by the computing device optically and for receiving information optically to be processed by the computing device, the IR receiver including:
   a photoresistor for receiving IR pulses, each individual pulse representing a bit;
   a first transistor having its collector coupled to the base of the phototransistor and its base coupled to the emitter of the phototransistor for compensating for effects of ambient light on the conducting threshold of the phototransistor;
   a capacitor coupled between the base of the first transistor and ground for filtering the effect of the received IR pulses from the effect of ambient light on the operation of the first transistor; and
   a second transistor having its base coupled to the emitter of the phototransistor and base of the first transistor for converting the received IR pulse to a corresponding signal interpretable by the computing device;
   memory within the computing device for storing information including data and instructions, some of the instructions for processing information and other instructions for transmitting and receiving information optically, the memory storing information entered through the data entry means for transmission via the optical transceiver and for storing information received via the optical transceiver;
   a data processor coupled to the power source, memory and optical transceiver and programmed for processing information entered through the data entry means or received via the optical transceiver, the data processor further programmed for reformatting information for transmission from a nonreturn to zero format to a return to zero format and for reception from a return to zero format to a non-return to zero format; and
   means within the data entry means for initiating the transmission or reception of information via the optical transceiver,
   the computing device thereby able to optically receive information from an external source for processing and able to optically transmit information to an external destination.

5. The apparatus of claim 4 wherein the data entry means comprises a keyboard and the computing device comprises a calculator.

6. Apparatus for enabling a computer to transmit and receive IR signals via a serial port of the computer, comprising:
   formatting means coupled to the serial port for formatting signals transmitted from the serial port from a nonreturn to zero bit format to a return to zero bit format and for formatting signals to be received by the serial port from a return to zero bit format to a nonreturn to zero bit format;
   an IR transmitter coupled to the formatting means for receiving signals having a return to zero format and transmitting such signals as IR pulses;
   an IR receiver coupled to the formatting means for receiving IR pulses having a return to zero bit format and passing such signals to the formatting means, the IR receiver including:
   a phototransistor for receiving an IR signal;
   a first transistor having its collector coupled to the base of phototransistor and its base coupled to the emitter of the phototransistor for compensating for the effects of ambient light on the conducting threshold of the phototransistor;
   a capacitor coupled between the base of the first transistor and ground for filtering the effects of the received IR signal from the effects of ambient light on the operation of the first transistor; and
   a second transistor having its base coupled to the emitter of the phototransistor and base of the first transistor for converting the received IR signal to a corresponding signal interpretable by the formatting means.

* * * * *

UNITED STATES PATENT AND TRADEMARK OFFICE
CERTIFICATE OF CORRECTION

PATENT NO. : 5,075,792
DATED : December 24, 1991
INVENTOR(S) : Preston D. Brown et al It is certified that error appears in the above-indentified patent and that said Letters Patent is hereby corrected as shown below:

Column 7, claim 4, line 33, delete "photoresistor" and insert therefor --phototransistor--.

Signed and Sealed this

Nineteenth Day of April, 1994

*Attest:*

BRUCE LEHMAN

*Attesting Officer*  *Commissioner of Patents and Trademarks*